Nov. 30, 1937.  C. H. PETSKEYES  2,101,010
BREAD SLICING MACHINE
Filed March 15, 1934   10 Sheets-Sheet 5
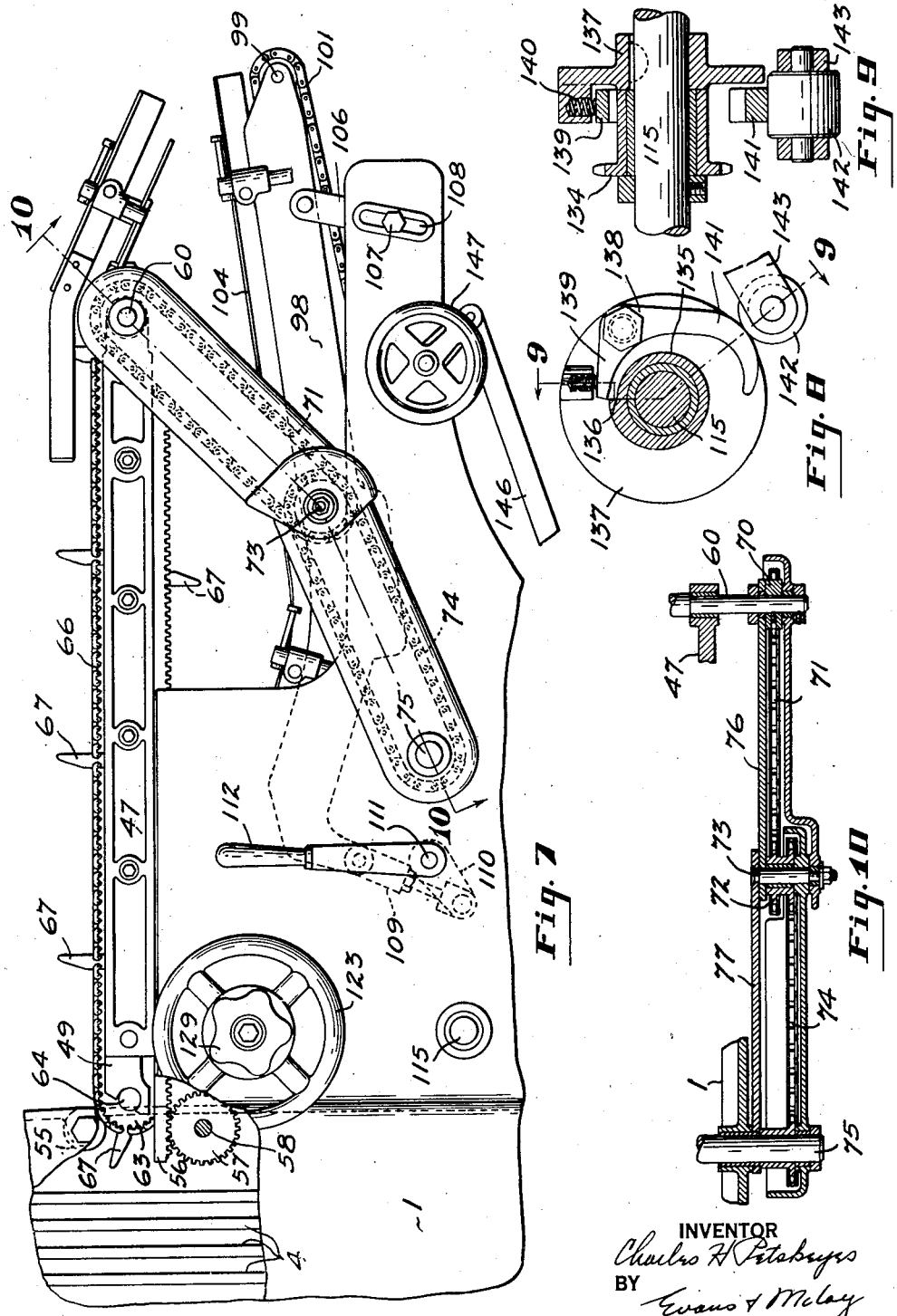
INVENTOR
Charles H. Petskeyes
BY
Evans & McLay
ATTORNEYS

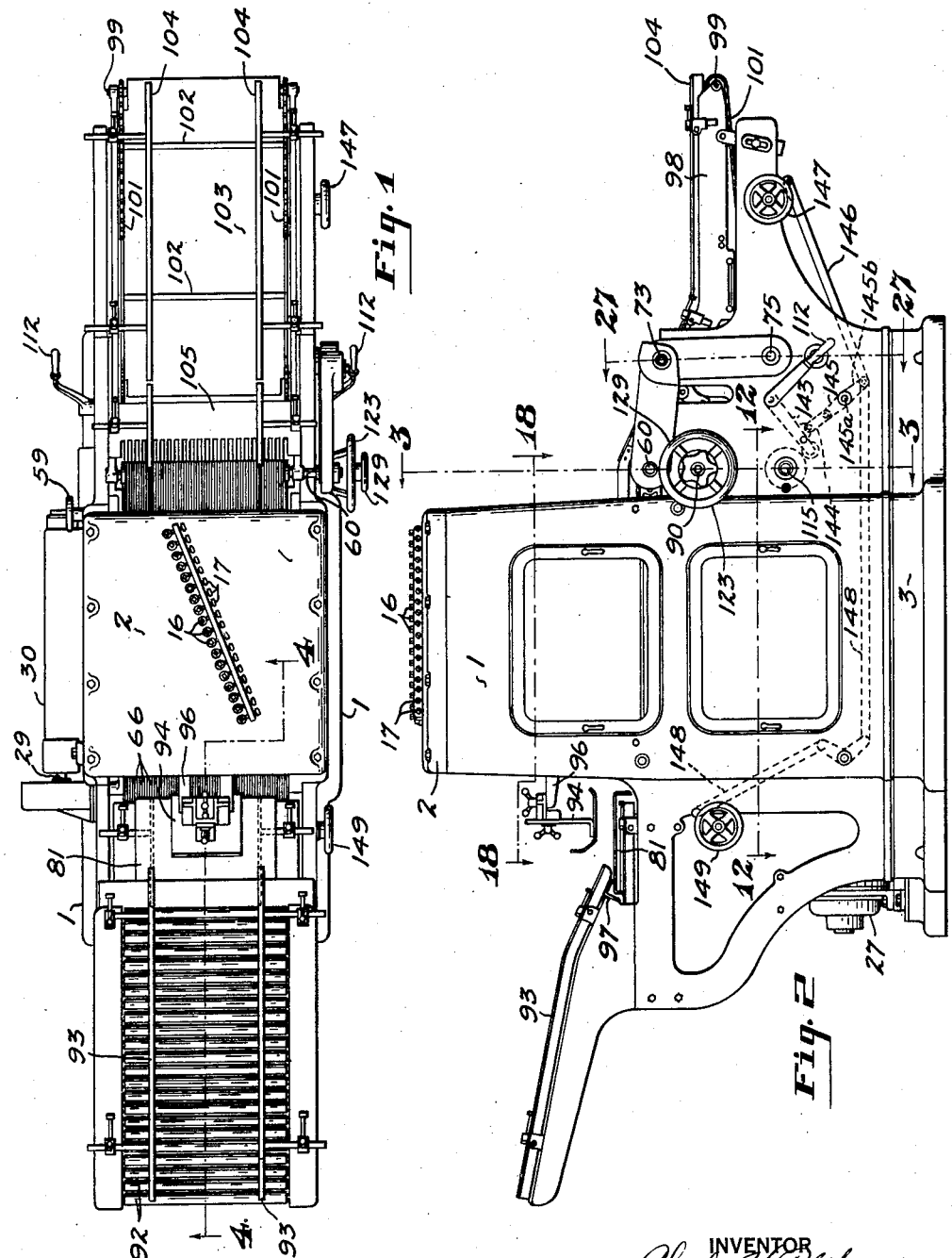

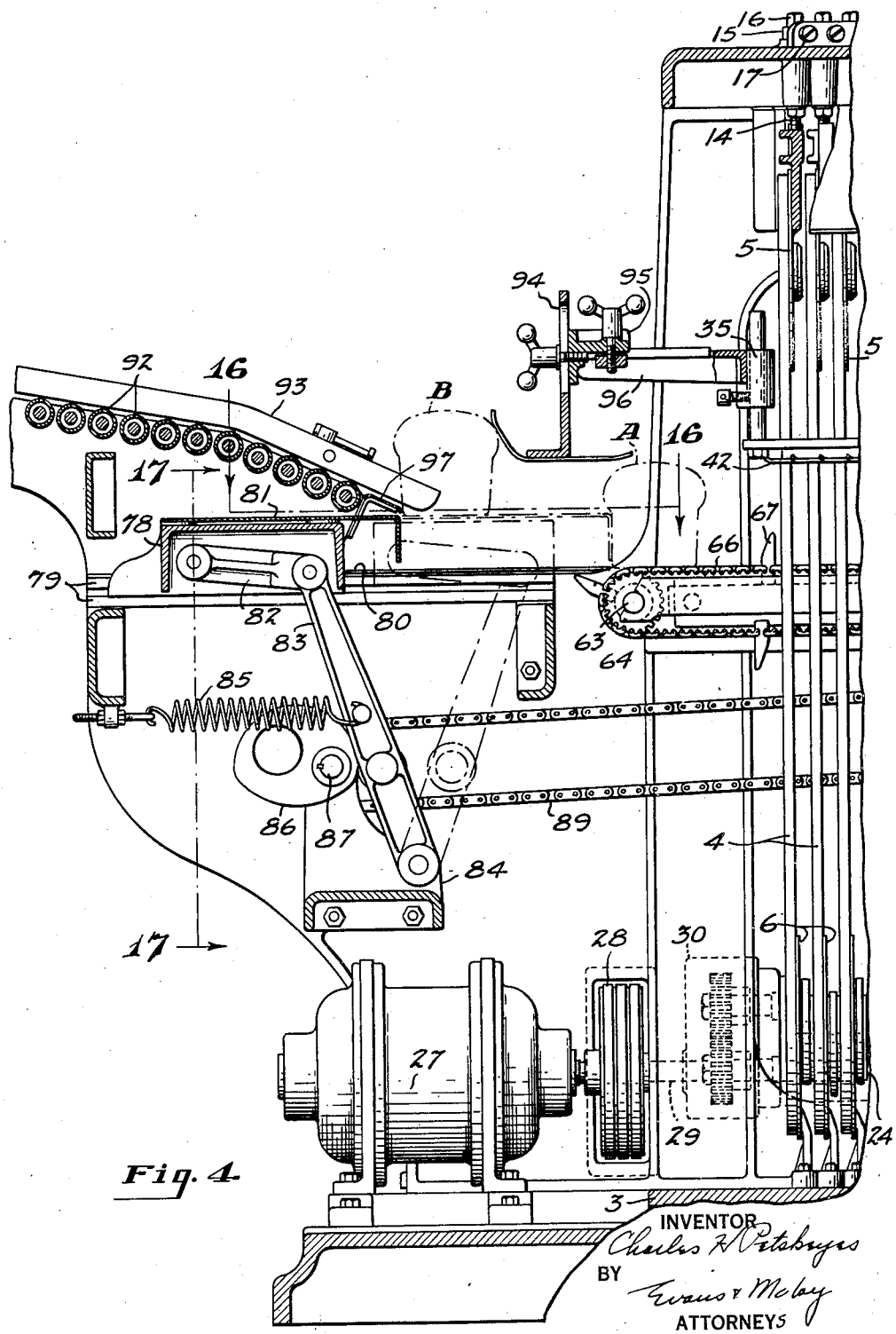

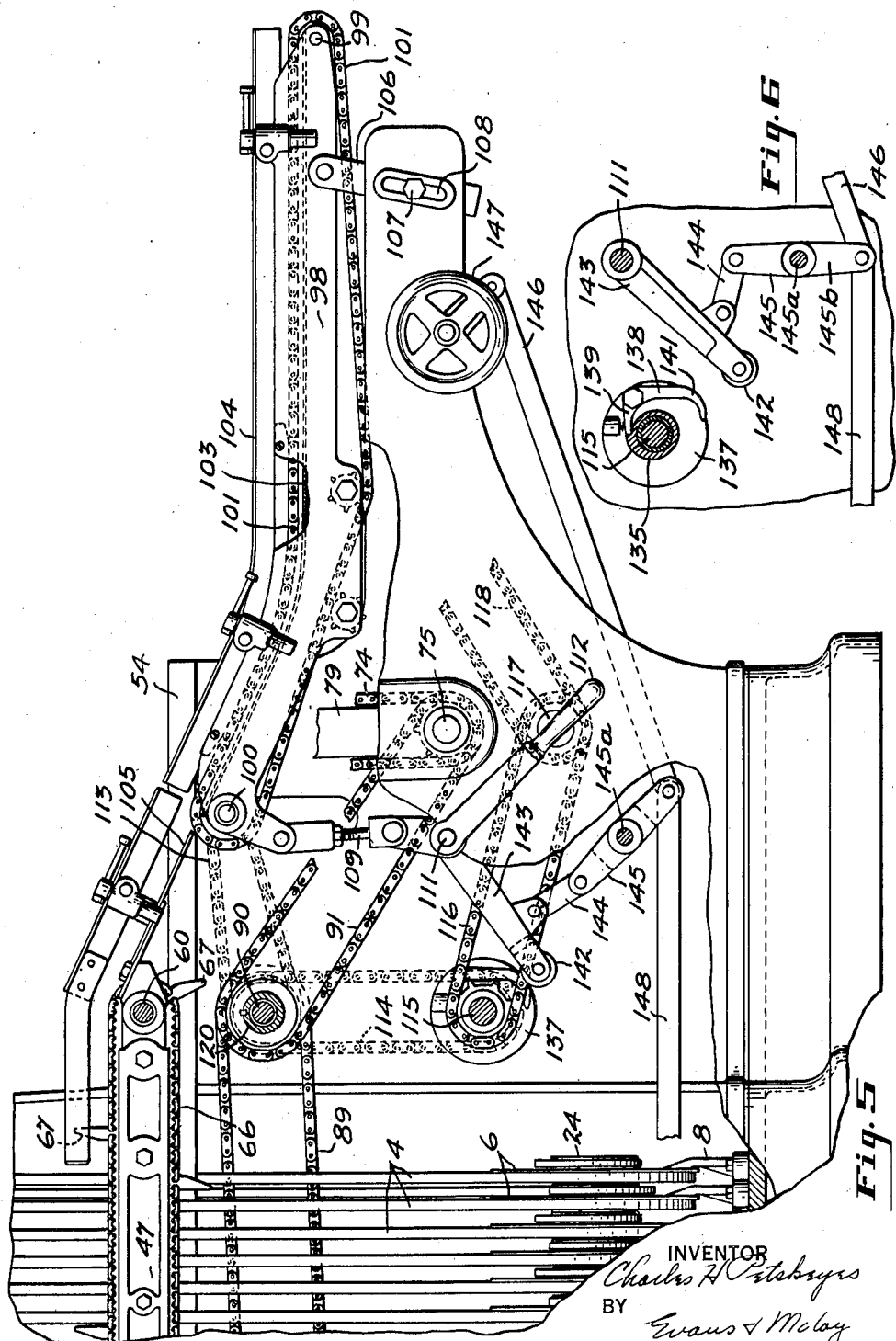

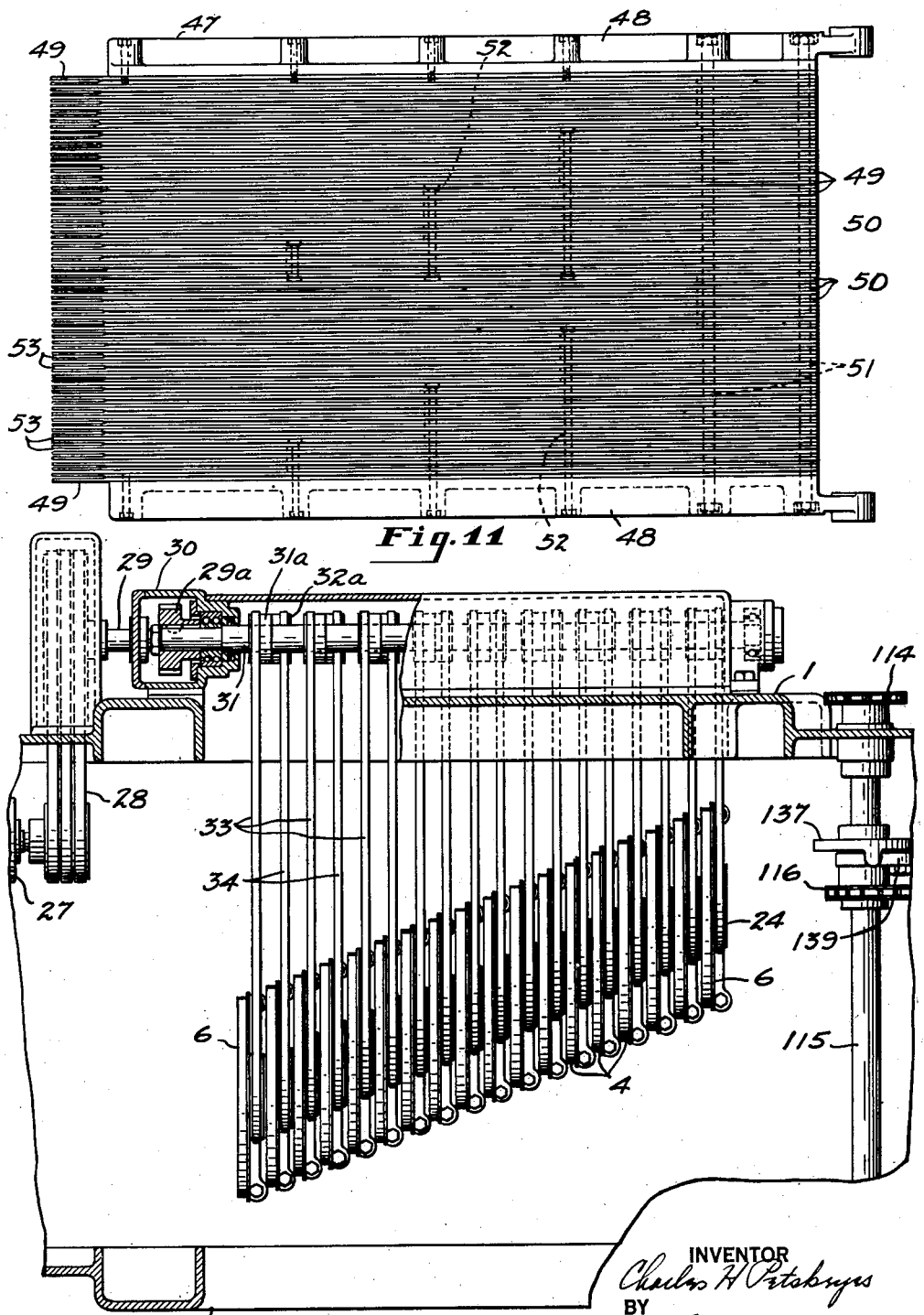

Nov. 30, 1937.  C. H. PETSKEYES  2,101,010
BREAD SLICING MACHINE
Filed March 15, 1934  10 Sheets-Sheet 7

INVENTOR
Charles H Petskeyes
BY
Evans & McCoy
ATTORNEYS

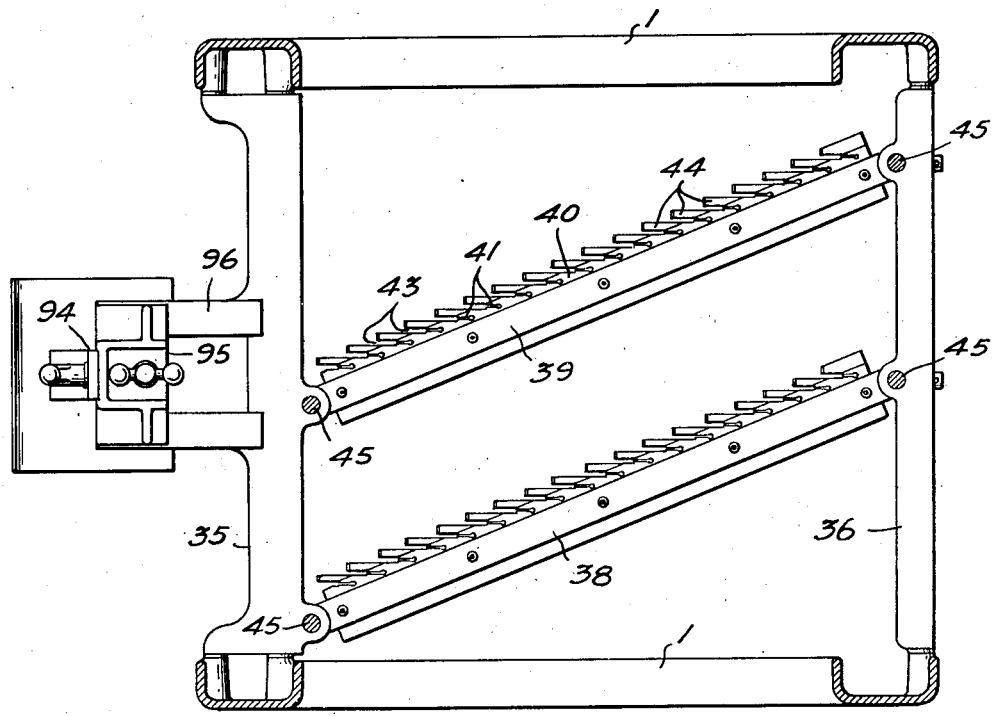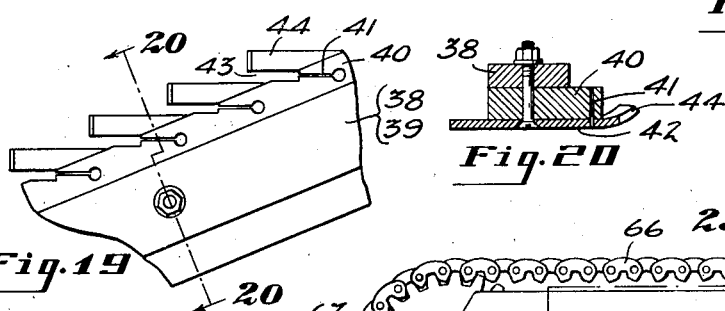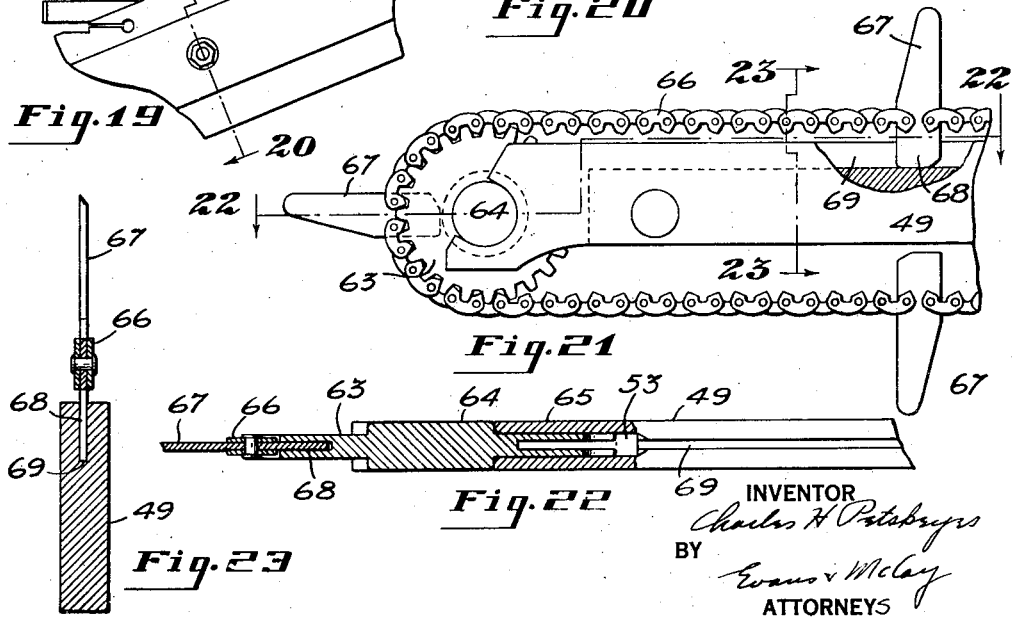

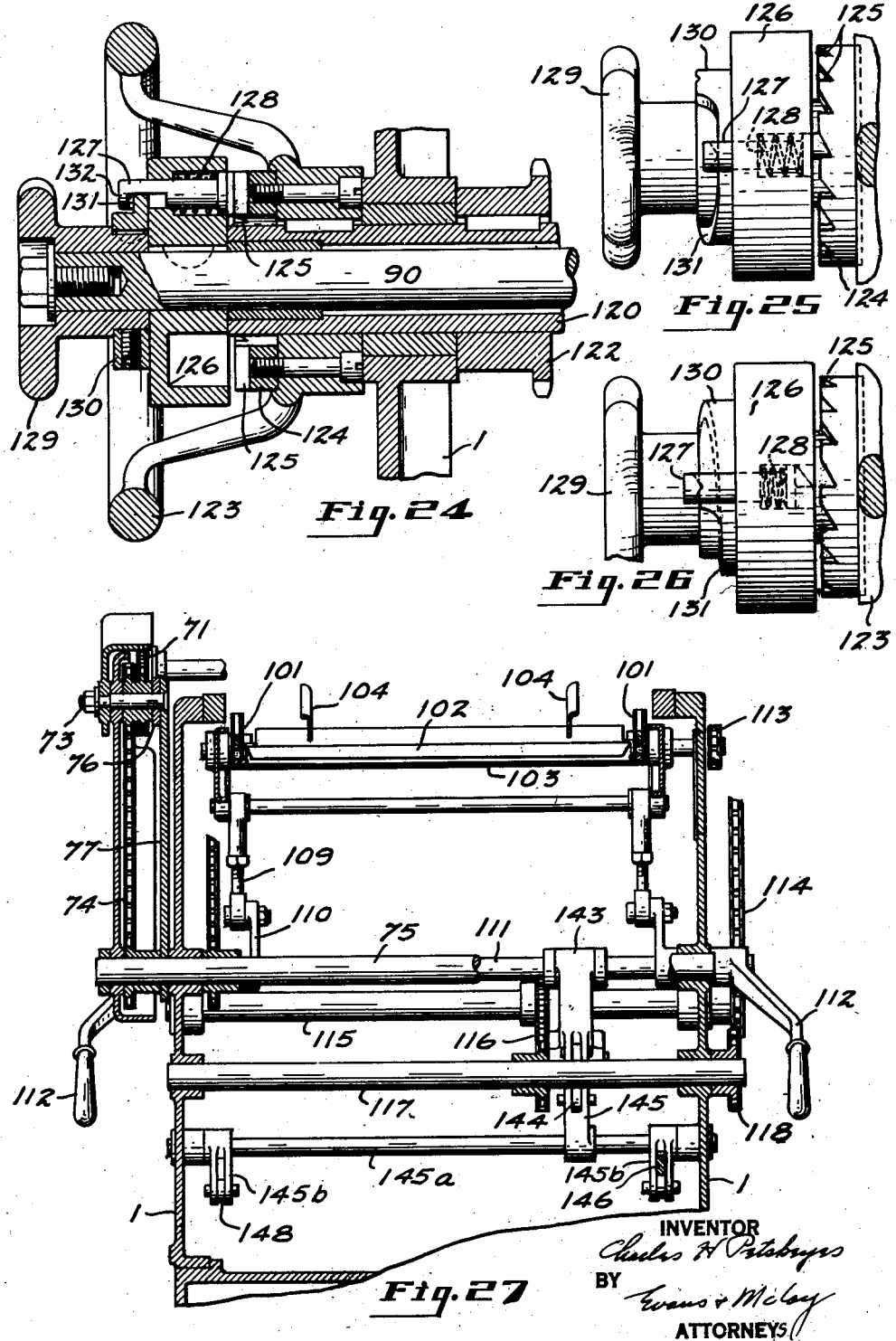

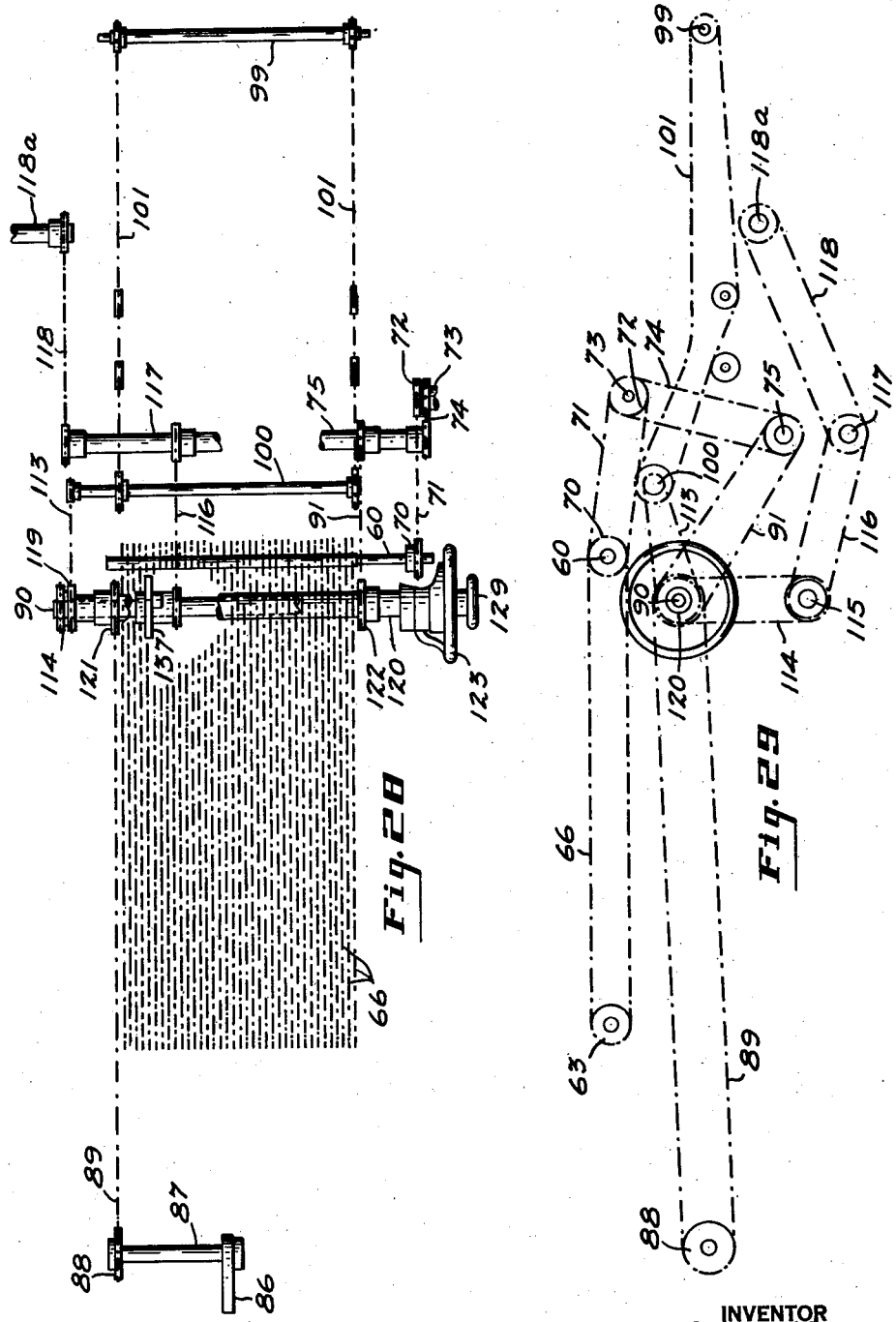

Patented Nov. 30, 1937

2,101,010

UNITED STATES PATENT OFFICE 2,101,010

BREAD SLICING MACHINE

Charles H. Petskeyes, Davenport, Iowa, assignor to Micro-Westco, Inc., Bettendorf, Iowa, a corporation of Delaware Application March 15, 1934, Serial No. 715,694

10 Claims. (Cl. 146—88)

This invention relates to slicing machines and more particularly to such machines for completely slicing a loaf article, such as bread, in a single operation.

One of the objects of the present invention is to provide a new and improved slicing machine in which loaves of bread and other articles may be rapidly and efficiently sliced.

Another object is to provide a slicing machine of the multiple band type in which each of the bands may be individually tensioned and in which the bands are interchangeable with each other.

Another object is to provide a slicing machine having a means for conveying articles to and through the slicing bands in which the conveying means may be driven independently of the slicing mechanism.

Another object is to provide a slicing machine having an endless feed conveyor and an endless discharge conveyor in which the conveyors may be adjusted relative to each other and synchronized to provide for the slicing of articles of different widths.

Another object is to provide a slicing machine of the multiple band type with a feed table of such construction that it may be retracted to permit easy removal and assembly of the cutter bands.

Another object is to provide a slicing machine of the multiple band type with a feeding mechanism in which a number of endless feed chains are employed and arranged in such manner that each chain operates between adjacent cutter bands.

Another object is to provide a slicing machine having an endless feed mechanism with a new and improved means for dispensing unsliced articles on the feed mechanism and which is synchronously operated with the feeding mechanism.

Another object is to provide a multiple band type slicing machine in which the portions of the band lying at both sides of the central axis thereof may operate in a slicing operation and in which all of the bands will not be in slicing operation at the same time, whereby to minimize friction during the slicing operation.

With the above and other objects in view, which will be apparent from the following detailed description, the invention consists in certain features of construction and combinations of parts which will be apparent to those skilled in the art to which the invention appertains.

In the drawings, which illustrate suitable embodiments of the present invention, Figure 1 is a plan view of the slicing machine of the present invention;

Fig. 2 is a side elevation of the machine shown in Fig. 1;

Fig. 4 is an enlarged fragmentary longitudinal section taken approximately on the line 4—4 of Fig. 1;

Fig. 5 is an enlarged fragmentary side elevation of the discharge end of the slicing machine, portions of the same being broken away and shown in section;

Fig. 6 is a section showing the main driving clutch and operating mechanism in its operative position, the same parts in Fig. 5 being shown in a position to disconnect the clutch from its operative condition;

Fig. 7 is an enlarged side elevation of the discharge end of the slicing machine showing the lower end of the discharge conveyor dropped and the feed table moved forwardly over the discharge conveyor away from the cutting bands;

Fig. 8 is a section through the clutch shaft showing the clutch actuating mechanism engaged with the clutch to disconnect the same from its driving position;

Fig. 9 is a section taken approximately on the line 9—9 of Fig. 8;

Fig. 10 is a section taken approximately on the line 10—10 of Fig. 7;

Fig. 11 is a plan view of the feed table, the same being removed from the slicing machine, and with the feed conveyor chains, sprockets and shafts removed to better illustrate the feed table;

Fig. 12 is an enlarged section taken approximately on the line 12—12 of Fig. 2, showing the offset arrangement of the lower band pulleys, and showing the mechanism for driving the same;

Fig. 18 is an enlarged section taken approximately on the line 18—18 of Fig. 2, showing the arrangement of the blade guides;

Fig. 19 is an enlarged fragmentary plan view of one of the blade guides;

Fig. 20 is a section taken approximately on the line 20—20 of Fig. 19;

Fig. 21 is a fragmentary side elevation of one of the strips forming the feed table showing its individual conveyor chain;

Fig. 22 is a section taken on the line 22—22 of Fig. 21;

Fig. 23 is a section taken on the line 23—23 of Fig. 21;

Fig. 24 is an enlarged section taken through the compensating mechanism for synchronizing the feed and discharge conveyors;

Fig. 25 is a fragmentary elevation of the clutch mechanism of the compensator illustrated in Fig. 24 and showing the clutch in engagement;

Fig. 26 is a view similar to Fig. 25 but showing the clutch in disengaged position;

Fig. 27 is an enlarged transverse section taken approximately on the line 27—27 of Fig. 2;

Fig. 28 is a diagrammatic plan view showing the arrangement of the conveyors, driving link, chains; and Fig. 29 is a diagrammatic side view showing the arrangement of the various driving link chains.

Figure 3:
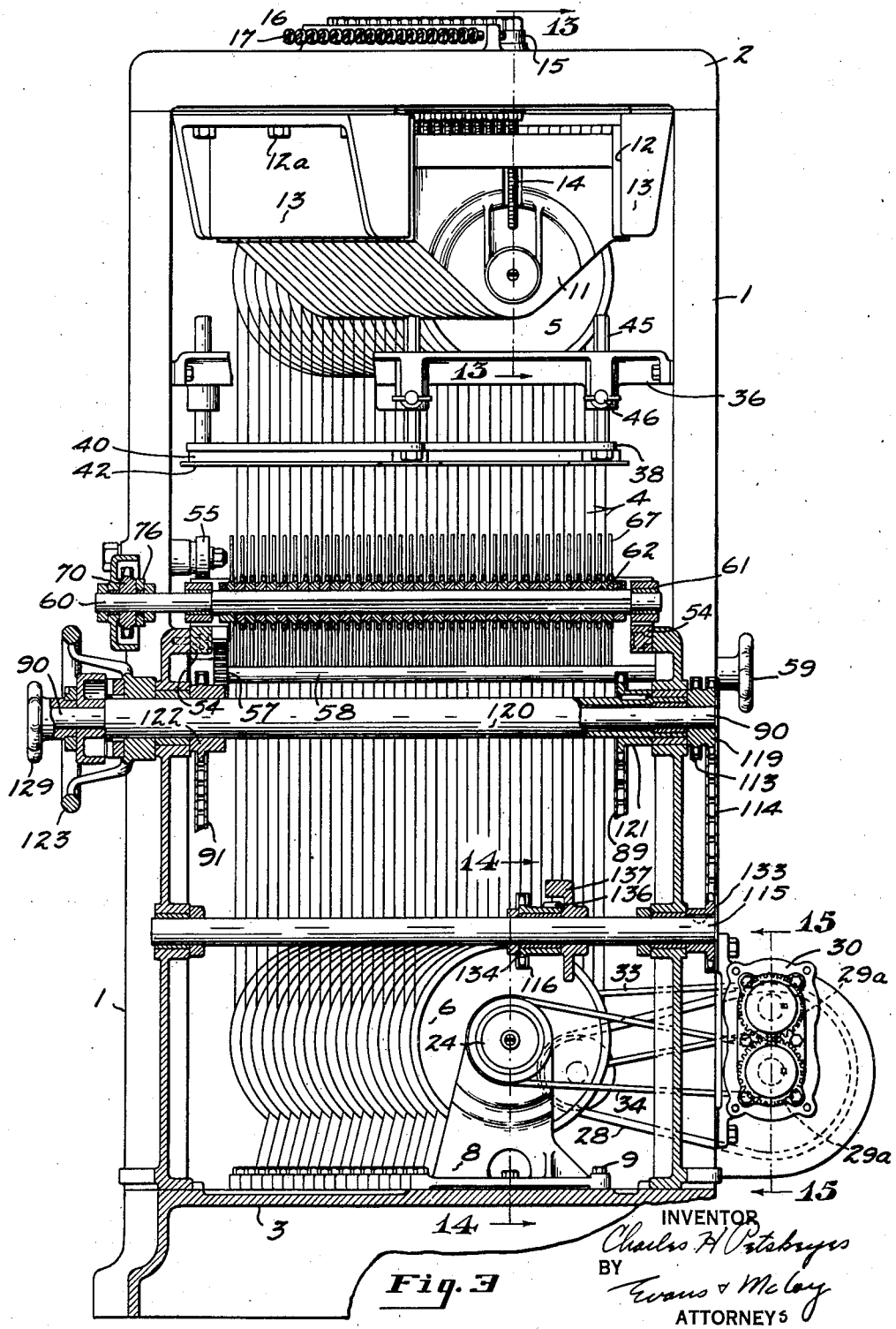
Fig. 3 is an enlarged transverse section taken approximately on the line 3—3 of Fig. 2.
Figure 15:
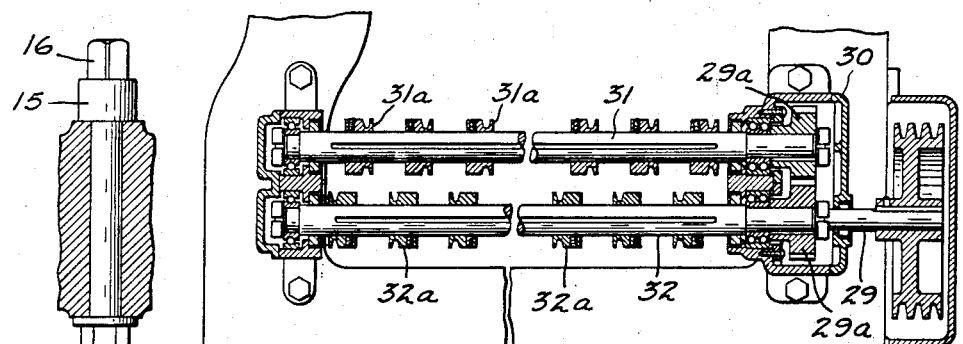
Fig. 15 is a section taken approximately on the line 15—15 of Fig. 3.

Referring to the accompanying drawings in which like numerals refer to like parts throughout the several views, the apparatus of the present invention includes a pair of spaced side frames 1 having an upper cross member 2 and a lower cross member 3. This framework supports the slicing mechanism, the feeding mechanism and the mechanism for conveying the sliced articles away from the slicing mechanism.

The slicing mechanism (Figs. 3, 4, 5, 13, 14 and 15) comprises a series of endless cutter bands 4 mounted upon upper and lower pulleys 5 and 6, respectively, there being an upper pulley 5 and a lower pulley 6 in the same plane for each band. One of these pulleys is driven by a suitable means to be later described, to provide an individual drive for each band 4. Each band is offset laterally and rearwardly of each forward band so that all of the bands will not be entered in the article being sliced at the same time. Furthermore, a sufficient number of bands is provided so that the portion of the rearmost band at one side of the common plane of the axes of the pulleys 5 and 6 lies in a plane spaced from the portion of the forward band lying at the opposite side of its pulleys a distance equal to the lateral offset of each band from the band immediately forwardly or rearwardly therefrom so that during the slicing of an article such as a loaf of bread, both portions of the band may be utilized in the slicing operation. If desired, however, the bands may be offset at random rather than uniformly or in a straight line.

Figures 14, 17:
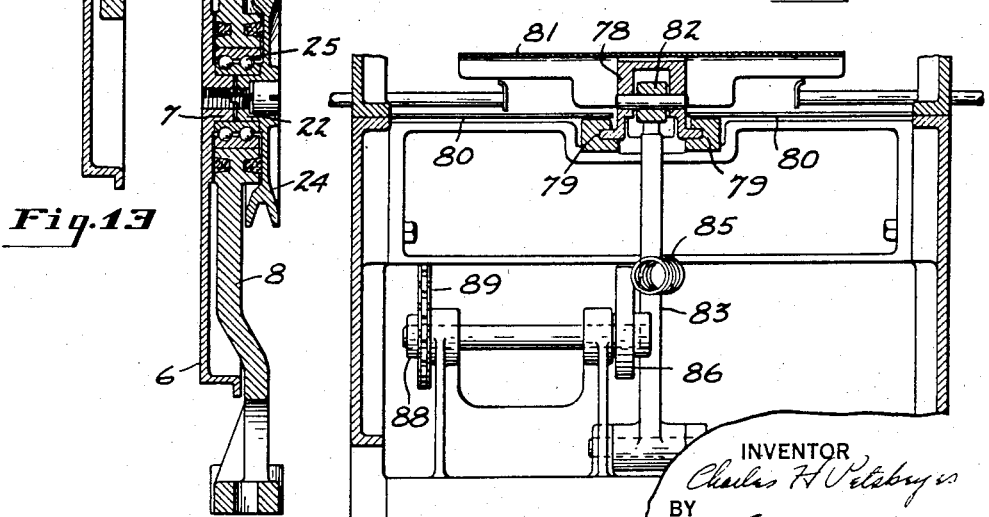
Fig. 14 is a section taken approximately on the line 14—14 of Fig. 3, showing the detailed mounting of one of the lower pulleys.
Fig. 17 is a section taken approximately on the line 17—17 of Fig. 4.

Each lower pulley 6 is mounted on an individual bearing 7 as seen in Figs. 3 and 14, carried by a supporting bracket 8 which is secured by means of bolts 9 to the lower cross piece 3. The openings in the bracket through which the bolts 9 extend are elongated so that the lower bracket may be adjusted to provide the proper centering and tracking of the band 4 on the pulleys 5 and 6. The bearing 7 is disposed longitudinally of the side frames 1 and each bearing 7 of the lower series is offset a distance equal to the thickness of a slice to be cut as shown in Figs. 3 and 12.

Each upper pulley (Figs. 3, 4 and 13) 5 is similarly mounted on a bearing 10 carried by a bracket 11. The brackets 11 are slidably mounted in suitable grooves or ways 12 provided in hangers 13 which are suitably secured such as by means of the bolts 12a to the upper frame cross member 2. Each bracket 11 is supported in its hanger 13 on an adjusting bolt 14 threaded into the bracket 11, which bolt extends through and is free to turn in the upper cross member 2. The bolt 14 is also formed with a shoulder portion 15 for taking the downward thrust and a squared end 16 so that it can be rotated in the cross piece 2 to raise or lower the bracket 11, and thereby provide for the proper tensioning of the band 4. A suitable screw 17 is provided for engagement with the bolt 14 as indicated in Fig. 3, to lock the adjusting bolt 14 in any desired adjusted position. Other means for locking the bolt 14 may of course be provided. Each of the brackets 11 is provided with such an adjusting means so that the various bands 4 may be individually tensioned.

Figures 13, 16:
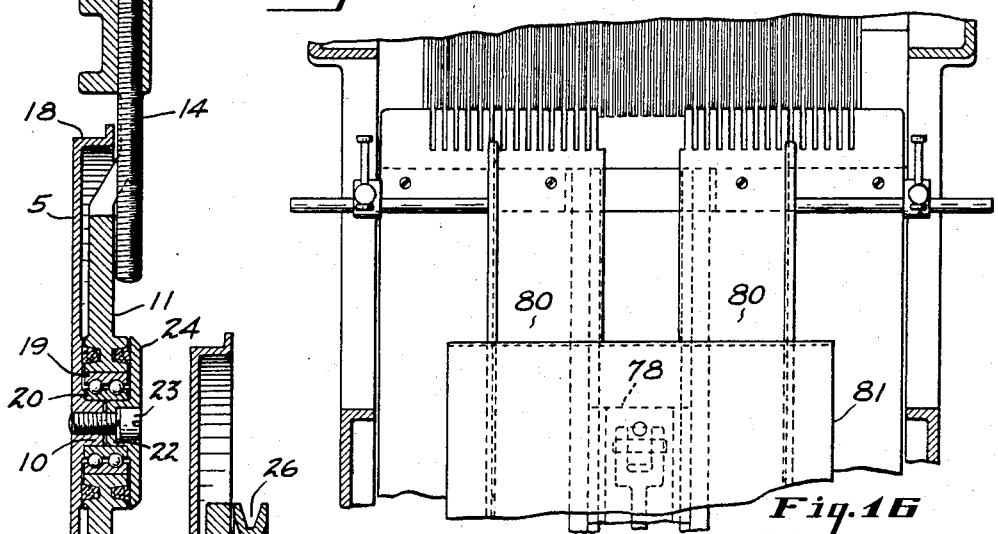
Fig. 13 is an enlarged section taken approximately on the line 13—13 of Fig. 3, showing the detailed mounting of one of the upper pulleys.
Fig. 16 is a section taken approximately on the line 16—16 of Fig. 4.

As shown in Fig. 13 the lower portion of the bracket 11 is offset to lie within the circumferential flange 18 of the pulley 5. In the construction shown in Fig. 13 a ball bearing unit is employed to rotatably support the pulley 5, the outer race 19 being carried in the aperture of the bracket 11 and the inner race 20 being carried by the pulley 5. The pulley 5 has a shaft portion or boss 10 extending part way through the race 20 from the one side and a flanged boss 22 extends in from the other side of the inner race and the two boss portions are interlocked, a screw 23 being provided to clamp the inner race 20 between the web of the pulley 5 and the flange 24 of the boss 22, thus providing a freely rotating pulley.

The lower pulley 6, as shown in Fig. 14, is mounted on a ball bearing 25 in a manner similar to the upper pulley 5 with the exception that in this lower construction the flange 24 of the boss 22 is formed with a circumferential groove 26 therein for the reception of a driving belt.

The pulleys 5 of the upper series and the pulleys 6 of the lower series are so arranged with respect to each other that sufficient clearance is provided for removing and assembling the individual bands without necessitating the removal of the pulleys or their supporting brackets.

The slicing mechanism is driven from the motor 27 which by means of belts 28 drives the shaft 29 of a power take-off device 30 (Figs. 3, 4 and 12), the device 30 having a pair of shafts 31 and 32 which are driven in opposite directions by means of intermeshed gears 29a. The shafts 31 and 32 are preferably provided with pulleys or driving surfaces 31a and 32a, respectively, which drive the band pulley operating belts 33 and 34, respectively. The belts 33 and 34 are mounted in the grooves 26 provided in the flange portions 24 of the lower series of pulleys 6 or in such a manner that the belts 33 drive alternate pulleys 6, whereas the belts 34 drive the intermediate pulleys 6 so that each cutter band 4 is driven in a direction opposite to the adjacent cutter bands. In other words, the belts 33 and 34 are so arranged that alternate bands will be driven in the same direction, whereas the intermediate bands will be driven in the opposite direction. However, the pulleys may be driven from a single shaft by using alternate crossed and uncrossed drive belts. Also, it is possible by rearranging the pulleys 31a and 32a on shafts 31 and 32 and the driving belts 33 and 34 to secure any other arrangement with respect to direction of travel of adjacent bands as may be found desirable.

In order to insure against twisting or deflecting of the cutter bands 4 adjacent the article being sliced, a suitable guiding mechanism (Figs. 3, 18, 19 and 20) is provided which comprises forward and rearward cross pieces 35 and 36, respectively, extending between the side frames 1, and a pair of elements 38 and 39 extending diagonally between the cross pieces 36 and 37 adjacent to and at angles corresponding to the planes of the cutting edges of the bands, one such element being provided for the halves of the bands at one side of the pulleys and the other element being provided for the band halves at the other side of the pulleys.

Each of the elements 38 and 39 carries a guide strip 40 preferably of bakelite or other non-metallic material having slots 41 therein which receive and guide the cutter bands. A bread guide plate 42 is also provided at the bottom side of the strip 40 for engagement with the top of the bread or other article being sliced, this guide 42 having slots 43 therein which provide fingers 44 that extend between the bands 4 and have their ends turned upwardly so as to permit the passage of the loaf of bread or other article beneath the guide elements. The bread guide plate 42, however, may be eliminated if desired.

The elements 38 and 39 are vertically adjustable and have at their ends suitable guide posts 45 which extend upwardly through the cross pieces 35 and 36, thumb screws 46 being carried by the cross pieces 35 and 36 to engage with and hold the posts 45 in the desired vertical position. This provides an adjustment so that loaves of bread or other articles of different heights may be properly guided and held against substantial vertical movement during the slicing operation.

The bread or other article to be sliced is supported on a substantially horizontal feed table 47 (Fig. 11) which comprises a pair of spaced side pieces 48 and a number of spaced slice supporting strips 49 intermediate the side pieces 48 which extend between the cutter bands 4. These strips 49 are held in spaced-apart relation by spacers 50 of varying lengths, the spacers 50 terminating at the rearward end of the table and bolts 51 are employed to clamp the side pieces, strips 49 and spacers 50 together at this end of the table. The spacers 50 extend toward the forward end of the table and terminate in groups of different lengths adjacent the non-cutting edges of the bands as indicated in Fig. 11, to compensate for the offset arrangement of the cutter bands. Other bolts 52 are employed to securely clamp different groups of the strips and spacers together intermediate the ends of the strips 49. This provides a supporting table having band receiving slots 53 therein between the strips 49 and of different lengths which open through the forward end of the table.

The table 47 is so mounted on the side frames 1 that it can be moved bodily rearwardly until the forward end thereof clears the cutter bands 4 to thereby enable the cutter bands 4 to be individually and easily removed without disassembling the slicing machine. The table 47 is slidably supported on ledges 54 carried by the side frames and is held in position against the ledges 54 by suitable rollers 55 rotatably carried by the side frames.

One of the side pieces 48 of the feed table is provided with a rack 56 (Figs. 3 and 7) at its lower side, the teeth of which are meshed with a suitable gear 57. The gear 57 is mounted on a shaft 58 journalled in the adjacent side frame at the rearward end thereof and the shaft is capable of being rotated by means of a hand wheel 59 carried by the squared end of the shaft. By rotating the hand wheel 59 the table 47 can be moved rearwardly to the approximate position indicated in Fig. 7 so that the end of the table will clear all of the cutter bands 4 when it is desired to remove or assemble the cutting bands to the pulleys.

The table 47 also carries a means for feeding the loaves of bread or other articles to, through and beyond the cutter bands. This means (Figs. 3, 4, 7, 21, 22 and 23) includes a shaft 60 mounted in bearings 61 at the forward end of the table 47 which carries a plurality of sprockets 62 each sprocket lying in a plane disposed midway adjacent the cutter band and at the center of the strip 49 which extends between such cutter bands.

As shown in Figs. 21 and 22 the end of each strip 49 is bifurcated and recessed to receive a narrow sprocket 63 having short hub or shaft portions 64 journalled in the recesses of the arms 65 provided by the bifurcation, and this sprocket 63 is in direct alignment with one of the sprockets 62 at the opposite end of the table so that these aligned sprockets 62 and 63 carry a feed chain 66 which passes between a pair of the cutter bands. Each chain 66 is provided with spaced slice engaging flights 67 thereon and each chain is guided during its passage between the bands 4 by spaced webs 68 which slide within a groove 69 formed centrally in each strip 49 in such a manner that the groove 69 and web 68 will prevent any lateral deflection of the chain 66, and thereby avoid interference of the flights 67 with the cutter bands 4. The chains 66 are, of course, so arranged that the flights 67 thereof are disposed in aligned series.

It is thus seen that the individual chains 66 of the conveyor pass between adjacent cutter bands to carry the bread or other article which is to be sliced to, through and beyond the cutter bands and also that the assembled bread supporting table and feeding mechanism can be moved bodily as a unit to clear the bands 4 to thereby permit ease and individual assembly of the cutter bands 2 and disassembly of the same from the pulleys on which they operate.

The drive shaft 60 for the conveyor chains 66 is provided with a sprocket 70 (Figs. 7, 10 and 29) which is driven by a drive chain 71 that is operated by a sprocket 72 journalled on a shaft 73, the sprocket 72 being driven by a drive chain 74 from a drive shaft 75.

The shaft 73 is journalled in the ends of suitable links 76 and 77, the opposite end of the links 76 being pivoted about the conveyor shaft 60 and the opposite ends of the links 77 being pivoted about the drive shaft 75 so as to permit the shaft 73 to be moved rearwardly with the feed table 47 and thereby avoid slack in the drive chain for the feed chain 66 when the feed table 47 is retracted to remove the strips 49 from between the cutter bands 4.

The loaves of bread or other unsliced articles are fed to the feed table by means of an intermittently operated feed mechanism (Figs. 4, 16 and 17) which includes a reciprocable pusher 78 that is guided at its ends in suitable ways 79 supported by cross pieces carried by the side frames. The pusher 78 reciprocates between a pair of article supporting plates 80 disposed substantially on a level with the feed table 47 and is provided with a mounted pusher plate 81, this pusher plate having a downturned portion which is vertically disposed to move over the article supports 80 and engage with the article deposited on the supports 80 to move such article toward and upon the feed table in advance of a series of flights 67.

The pusher 78 is synchronized with the feed conveyor chain 66 so that upon each forward movement of the pusher an unsliced article will be positioned on the feed table in advance of a series of flights 67. The pusher actuating mechanism preferably comprises a pair of pivotally connected links 82 and 83, the free end of link 82 being pivoted to the pusher 78 and the free end of the link 83 being pivoted to a support 84 mounted between the side frames 1. A coil spring 85 is also employed to hold the link 83 and pusher 78 in a normally retracted position, as indicated in Fig. 4. The link 83 is actuated by a cam 86 mounted on a shaft 87 which is journalled in the support 84. The shaft 87 is provided with a drive sprocket 88 which is driven by means of a suitable drive chain 89 from a common drive shaft 120. The common drive shaft 120 also provides, through a suitable drive chain 91, the drive for shaft 75 which causes the operation of the feed chains 66. It is to be noted that the same shaft 120 is utilized for driving the feed chains 66 and pusher cam 86 so that the pusher 78 is synchronized at all times with the flights 67 of the feed chains 66.

The article to be sliced is preferably deposited on the bread supports 80 by means of a gravity feed conveyor comprising a plurality of gravity rollers 92 and spaced guides 93 which terminate in a plane above the pusher 78 and forwardly of the feed chains 66. Mounted above the supports 80 and in advance of the end of the gravity feed member is a stop element 94 which is carried by a bracket 95 mounted on an extension 96 of the rearward frame cross piece 35. The stop 94 is also in advance of the pusher when the pusher is in its retracted position. When the pusher is moving rearwardly to position a loaf A, as indicated in Fig. 4, onto the feed table 47, the following loaf B which has moved down the gravity rollers 92 rests on the top of the pusher and against the stop 94 and then when the pusher moves back to its normal position the loaf B drops downwardly onto the supports 80 in front of the pusher plate 81, a stop plate 97 being employed to prevent forward movement of the loaf or other article during the retraction of the pusher.

The mechanism for removing the sliced loaves away from the feed table 47 preferably comprises an endless conveyor (Figs. 5, 7 and 27) which includes a pair of spaced side pieces 98 rigidly interconnected and having rearward and forward conveyor shafts 99 and 100. These shafts carry suitable sprockets on which conveyor side chains 101 are trained, the chains being interconnected by spaced article engaging flights 102 which operate over a discharge table 103. The side pieces 98 also carry adjustable loaf guides 104 for holding the sliced loaves in contiguous relation as they are moved along the discharge table 103. The space between the discharge table 103 and the feed table 47 is bridged by a suitable transfer plate 105 so that the sliced loaves can be discharged onto the table 103.

The rearward end of the discharge conveyor is vertically adjustable so that it can be operated in connection with a wrapping machine if desired, and this end is pivotally mounted on links 106 which are secured by bolts 107 to the side frames, the openings 108 in the side frames for the bolts 107 being elongated to permit the desired vertical adjustment of the discharge conveyor.

In order to permit the retraction of the feed table 47 when it is desired to remove and replace the cutter bands with other bands, the forward end of the discharge conveyor is disposed so that it can be swung downwardly (Fig. 5) and this movement is provided by means of a locking linkage 109 which is connected with a rod carried by the conveyor side pieces 98 and with an arm 110 mounted on a shaft 111 which is carried by the side frames. The shaft 111 is rotated by levers 112 at the opposite sides of the machine which when moved in upward direction will cause the forward end of the discharge conveyor to drop downwardly out of the plane of movement of the feed table 47.

The forward shaft 100 of the discharge conveyor is driven by means of a suitable link belt 113 from the common drive shaft 90 so that the flights 102 of the discharge conveyor may be synchronized with the flights 67 of the feed chains 66.

The common drive shaft 90 is driven by a drive chain 114 from a shaft 115 which in turn is driven by a drive chain 116 from the main drive shaft 117. The main drive shaft 117 may be driven in any suitable manner such as by a drive chain 118 connected with the driving shaft 118a of a wrapping machine (not shown), in order that the flights 102 of the discharge conveyor may be synchronized with the infeed plates of the wrapping machine.

In order that proper synchronization of the flights 102 of the discharge conveyor and flights 67 of the feed mechanism will obtain when loaves of different widths are to be sliced, provision is made for adjusting the relative positions of these flights. This is accomplished by providing a compensator on the shaft 90 so that the feed conveyor chains 66 can be rotated relative to the discharge conveyor to advance the flights of one relative to the other.

It will be noted from Figs. 3, 24, 25 and 26 that the sprockets 119 for the drive chain 113 that drives the discharge conveyor and for the drive chain 114 that is driven from the drive shaft 115 are keyed or otherwise secured to the shaft 90 and that the shaft 90 is journalled in a tubular shaft 120 which in turn is journalled in the side frames 1. The sprocket 121 for the cam drive chain 89 and the sprocket 122 for the feed conveyor drive chain 91 are keyed to the tubular shaft 120.

Rigidly mounted on the end of the shaft 120 outwardly of the side frame is a hand wheel 123 and secured to the hub of the hand wheel is an annular ring 124, the radial face of which is formed with an annular series of ratchet teeth 125.

The shaft 90 also has an annular plunger supporting member 126 secured thereto outwardly of the tubular shaft 120 which member is recessed to slidably receive a plunger 127, a spring 128 being interposed between the head of the plunger and bottom of the recess to constantly urge the plunger into engagement with one of the ratchet teeth 125 to thereby effect a drive between the shafts 90 and 120. Rotatably positioned on the outer end of the shaft 90 is a hand wheel 129 which carries an annular member 130, the annular member 130 having a cam face 131 which engages with a finger 132 formed on the end of the plunger 127 that projects beyond the member 126.

In order to disconnect the shafts 90 and 120 to permit independent rotation of the same it is only necessary to hold the hand wheel 129 stationary and rotate hand wheel 123 so that during this relative rotation the cam face 131 will retract the plunger 127 from its engagement with the ratchet teeth 125. When the two shafts are thusly disconnected the hand wheel 123 can then be rotated to advance or retard the flights 67 of the feed chains 66 relative to the flights 102 of the discharge conveyor to thus provide the desired synchronization of the flights, that is the time when the flights 102 will arrive at the proper bread receiving position.

It is also possible to advance the flights 67 of the feed chains 66 relative to the flights 102 of the discharge conveyor by advancing the plunger 127 over the ratchet teeth 125 of the compensator without actually disconnecting the two shafts, thereby effecting the desired synchronization in a speedy manner.

This also provides a means whereby the discharge conveyor can be operated independently of the feed mechanism such as when it is desired to use the discharge conveyor as a means for feeding unsliced articles to a wrapping machine.

In the case where the drive shaft 117 is driven from a wrapping machine in which case the flights of the discharge conveyor deposit the sliced articles directly upon the infeed conveyor of the wrapper, I have provided a clutch device so that the flights 102 of the discharge conveyor will always stop at a predetermined location and will only start again at a predetermined time with respect to the feed flights of the wrapping machine. This clutch device is carried by the main drive shaft 115 (Figs. 5, 6, 8 and 9) and in this case the sprocket 133 for the drive belt 114 is rigidly keyed to drive shaft 115 and the sprocket 134 for the drive chain 116 is rotatably mounted on the shaft 115 in an axially fixed manner.

As indicated in Figs. 6, 8 and 9, the hub of the sprocket 134 is provided with a cam surface 135 which includes a stop shoulder 136. Rigidly secured to the shaft 115 is a collar 137 which pivotally supports a bell crank lever 138. One arm 139 of the bell crank lever 138 is disposed to engage with the cam surface 135 and with the stop shoulder 136, so that when the sprocket 134 is rotated the shaft 115 will also rotate to drive the drive shaft 90 for the feed and discharge conveyors, the arm 139 being yieldably held in engagement with the cam surface 135 by means of a spring 140 which is supported by the collar 137.

The other arm 141 of the bell crank lever 138 is curved so as to be engaged with a roller 142 which is movable to a position to cause the arm 141 to strike the same during rotation of the collar and thereby disengage the arm 139 from the shoulder 136 and hold it disengaged as long as the roller 142 is in its actuated position, so as to permit rotation of the sprocket 134 independently of the drive shaft 115. Inasmuch as the arm 141 will only engage with the roller in a single predetermined position, the driving face 136 will only engage the arm 139 of the bell crank and thereby cause rotation of the shaft 115 at such predetermined position, with the result that the flights of the discharge conveyor will be started in synchronization with the infeed flights of the wrapping machine, which provides the drive for the shaft 115.

The roller 142 is mounted on a swingable arm 143 which is hinged on the shaft 111 and which is connected by means of a link 144 with a lever 145 mounted on shaft 145a, which shaft carries a pair of levers 145b. The levers 145b are connected by linkages 146 with the hand wheel 147 at the discharge end of the slicer and by linkages 148 with the hand wheel 149 at the feed end of the slicer, so that by rotating either the hand wheel 147 or hand wheel 149 the roller 142 can be moved into and out of its clutch actuating position.

It will be observed from the foregoing description that I have provided a slicing machine in which the slicing mechanism is driven independently of the feeding and discharge mechanism, in which the feeding and discharge mechanisms can be properly synchronized for slicing loaves of bread or other articles of different widths and also in which the discharge mechanism is synchronized for operation with a wrapping machine and operable independently of the slicing and feeding mechanisms.

In the slicing mechanism, endless high speed cutter bands which are interchangeable with each other, are provided and each band can be individually tensioned to compensate for any degree of stretch or variation in length relative to other bands and also can be easily removed and replaced by other bands without disassembling any parts of the slicing machine. Furthermore, a new and improved feeding mechanism is provided which can be retracted to permit an easy removal and assembly of the cutter bands.

Although a single embodiment of the invention has been herein shown and described it will be understood that numerous details of the construction shown may be altered or omitted without departing from the spirit of this invention as defined in the following claims.

What I claim is:

1. In a slicing machine, a series of individual pulleys, each pulley having its axis offset with respect to the other pulleys in said series according to the thickness of the slices to be produced, a second series of pulleys, each having its axis offset with respect to the other pulleys in said series according to the thickness of the slices to be produced and each lying in the plane of a pulley in the other series, an endless cutter band carried by each pair of coplanar pulleys, each of said pulleys of one of said series having a driving pulley, a pair of intermeshed gears, shafts extending from said gears, belts carried by one of said shafts and some of said driving pulleys, belts carried by the other of said shafts and the other of said driving pulleys, and means for driving said gears.

2. In a slicing machine, a plurality of endless cutter bands, spaced pulleys supporting each of said bands, each band having its cutting edge offset with respect to the cutting edges of the other bands according to the thickness of the slices to be produced thereby providing one series of cutting edges at one side of said pulleys and a second series of cutting edges at the other side of said pulleys, a pair of side frames, cross members extending between said side frames and a pair of guide elements supported by said cross members adjacent said series of cutting edges, one of said elements having slots therein for receiving and guiding the portions of the bands at one side of said pulleys and the other of said elements having slots therein for receiving and guiding the portions of the bands at the opposite side of said pulleys, each of said elements being adjustable in the direction of movement of said bands and being engageable with a side of the article being sliced by said bands.

3. In a slicing machine, a plurality of endless cutter bands, spaced pulleys supporting each of said bands, each band having its cutting edge offset with respect to the cutting edges of the other bands according to the thickness of the slices to be produced, thereby providing one series of cutting edges at one side of said pulleys and a second series of cutting edges at the other side of said pulleys, a table for supporting an article to be sliced having a plurality of finger portions at one end extending between said cutter bands, said table comprising a plurality of elongated members of substantial identity, secured in spaced relation to each other, and means for slidably moving said table relative to said bands to move said finger portions from between said bands, whereby said bands may be removed from said pulleys.

4. In a slicing machine having a plurality of spaced cutters, an article supporting table having a plurality of finger portions at one end extending between said cutters, a plurality of sprockets at each end of said table arranged in coplanar pairs, each pair being disposed in a plane lying substantially midway between a pair of adjacent cutters, and a feed chain trained over the sprockets of each pair of sprockets lying between adjacent cutters, said table having a plurality of longitudinal grooves therein, each groove lying in a plane substantially midway between adjacent cutters, each feed chain having projecting guide fingers projecting into the adjacent groove for sliding movement therethrough to hold said chain against deflection.

5. In a slicing machine having a plurality of spaced cutters, an article supporting table having at one end a series of spaced strips extending between adjacent cutters, each of said strips at its end supporting a driven sprocket, a plurality of drive sprockets at the opposite end of said table, each of which is disposed in the plane of a driven sprocket, said plane lying substantially midway between adjacent cutters, a feed chain trained over each pair of coplanar drive and driven sprockets, said table having a longitudinal groove extending from end to end between each pair of adjacent cutters, said feed chains having guide fingers extending into said grooves with operating clearance, and means for driving said drive sprockets.

6. In a slicing machine having a plurality of spaced cutters, an article supporting table having at one end a series of spaced strips extending between adjacent cutters, the free end of each strip being bifurcated to provide spaced arms, said arms being recessed, a chain sprocket disposed between said arms and having relatively short shaft portions seating in the recesses of said arms, a chain sprocket at the opposite end of said table and in the plane of said first sprocket, and a feed chain trained over said sprockets.

7. In a slicing machine having a plurality of spaced cutters, an article supporting table having at one end a series of spaced strips extending between adjacent cutters, the free end of each strip being bifurcated to provide spaced arms, said arms being recessed, a chain sprocket disposed between said arms and having relatively short shaft portions seating in the recesses of said arms, a chain sprocket at the opposite end of said table and in the plane of said first sprocket, and a feed chain trained over said sprockets, said chain and table having overlapping portions to hold said chain against deflection.

8. In a slicing machine, a series of individual pulleys, each pulley having its axis offset with respect to the other pulleys in said series according to the thickness of the slices to be produced, a second series of pulleys, each having its axis offset with respect to the other pulleys in said series according to the thickness of the slices to be produced and each lying in the plane of a pulley in the other series, an endless cutter band carried by each pair of coplanar pulleys, each of said pulleys of one of said series having a driving pulley, means for driving the alternate driving pulleys in one direction, and means for driving the remainder of said driving pulleys in the other direction, whereby adjacent driving pulleys are driven in opposite directions.

9. In a slicing machine, an upper series of individual pulleys, the axes of said pulleys being parallel and each pulley having its axis offset with respect to the axes of the other pulleys in the series, a lower series of individual pulleys coplanar with the pulleys of said upper series and having their axes similarly arranged, endless cutter bands, each carried by a pair of coplanar pulleys, including an upper pulley and a lower pulley, one of each pair of coplanar pulleys having a driving pulley, a pair of shafts driven in opposite directions, belts carried by one of the shafts to drive alternate driving pulleys, belts carried by the other of the shafts to drive the other alternate driving pulleys, and means for driving said shafts.

10. In a slicing machine, a framework, slicing mechanism mounted in said framework and including a plurality of spaced cutting edges, an article supporting table comprising a plurality of elongated elements of substantial identity arranged in parallel relation with respect to one another and extending between the spaced cutting edges, said elements each having an unsupported cantilever end and an effective depth several times its width to retain the unsupported end against downward deflection, spacers positioned between the elements, clamping means arranged to hold the elements and spacers in fixed relation for unitary movement, means on the framework for slidably supporting the table, and means for moving the table on said means longitudinally with respect to the elements and with the unsupported ends of the elements passing between the cutting edges.

CHARLES H. PETSKEYES.